US012652323B2

(12) United States Patent
Mariyani et al.

(10) Patent No.: US 12,652,323 B2
(45) Date of Patent: Jun. 9, 2026

(54) CONTROLLABLE DEVICE REREGISTRATION TECHNIQUES

(71) Applicant: T-Mobile USA, Inc., Bellevue, WA (US)

(72) Inventors: Anil Kumar Mariyani, Ashburn, VA (US); Subramania Kaushik, Bellevue, WA (US); Anuj Sharma, Broadlands, VA (US)

(73) Assignee: T-Mobile USA, Inc., WA (US)

( * ) Notice: Subject to any disclaimer, the term of this patent is extended or adjusted under 35 U.S.C. 154(b) by 300 days.

(21) Appl. No.: 18/242,927

(22) Filed: Sep. 6, 2023

(65) Prior Publication Data

US 2025/0080591 A1     Mar. 6, 2025

(51) Int. Cl.
| | |
|---|---|
| *H04L 12/66* | (2006.01) |
| *H04L 65/1016* | (2022.01) |
| *H04L 65/1073* | (2022.01) |
| *H04L 65/1104* | (2022.01) |
| *H04W 60/04* | (2009.01) |

(52) U.S. Cl.
CPC ...... *H04L 65/1073* (2013.01); *H04L 65/1016* (2013.01); *H04L 65/1104* (2022.05); *H04W 60/04* (2013.01)

(58) Field of Classification Search
CPC ............. H04L 65/1016; H04L 65/1073; H04L 61/4588; H04L 65/1069; H04L 65/1104; H04L 67/1001; H04L 65/80; H04L 69/40; H04W 8/04; H04W 60/005; H04W 92/02; H04W 76/10; H04W 60/06; H04W 76/18; H04W 76/30; H04W 8/12
See application file for complete search history.

(56) References Cited

U.S. PATENT DOCUMENTS

| | | | | | |
|---|---|---|---|---|---|
| 2004/0203763 A1* | 10/2004 | Tammi | ................... | H04W 8/06 |
| | | | | 455/411 |
| 2007/0287454 A1* | 12/2007 | Zhu | ..................... | H04L 65/1073 |
| | | | | 455/435.1 |

(Continued)

FOREIGN PATENT DOCUMENTS

| | | |
|---|---|---|
| CN | 108289079 A | 7/2018 |

OTHER PUBLICATIONS

Search Report and Written Opinion for International Application No. PCT/US2024/044253, Dated Jan. 6, 2025, 9 pages.

*Primary Examiner* — Kharye Pope
(74) *Attorney, Agent, or Firm* — Lee & Hayes, P.C.

(57) ABSTRACT

Techniques for controllable device deregistration and reregistration provide for enhanced network operator control over the timing of device deregistration and reregistration with the network. Example techniques can be applied by a home subscriber service (HSS) of an internet protocol multimedia core network subsystem (IMS). In response to a reregistration notification initiated by a network operator, the HSS can create an IMS deregistration notification comprising a reregister bit and can set the reregister bit to an enabled state. The HSS can then forward the IMS deregistration notification to downstream network equipment such as call session control functions (CSCF), which can in turn forward the IMS deregistration notification to a user equipment (UE), thereby causing the UE to re-register with the IMS.

20 Claims, 6 Drawing Sheets

100

(56)　　　　　　References Cited

U.S. PATENT DOCUMENTS

| | | | |
|---|---|---|---|
| 2010/0217875 A1 * | 8/2010 | Belinchon Vergara ...................... H04L 65/1016 709/228 | |
| 2011/0149750 A1 * | 6/2011 | Sharma ............... H04L 65/1016 370/252 | |
| 2011/0171958 A1 * | 7/2011 | Hua ................... H04L 65/1073 455/435.2 | |
| 2011/0275372 A1 * | 11/2011 | Shi .......................... H04W 8/04 455/435.1 | |
| 2011/0286389 A1 * | 11/2011 | Atarius ................. H04W 8/183 370/328 | |
| 2016/0345284 A1 | 11/2016 | Yared | |
| 2018/0241784 A1 | 8/2018 | Hallenstål et al. | |
| 2019/0289040 A1 | 9/2019 | Merino Vazquez et al. | |
| 2020/0413326 A1 * | 12/2020 | Stille ................... H04L 12/1407 | |
| 2022/0248292 A1 * | 8/2022 | Wang ..................... H04W 4/90 | |
| 2022/0337636 A1 * | 10/2022 | Han ................. H04W 72/0453 | |
| 2023/0141522 A1 * | 5/2023 | Sinha ..................... H04W 8/08 455/414.1 | |
| 2024/0389051 A1 * | 11/2024 | Cogalan ............... H04W 60/04 | |

* cited by examiner

400

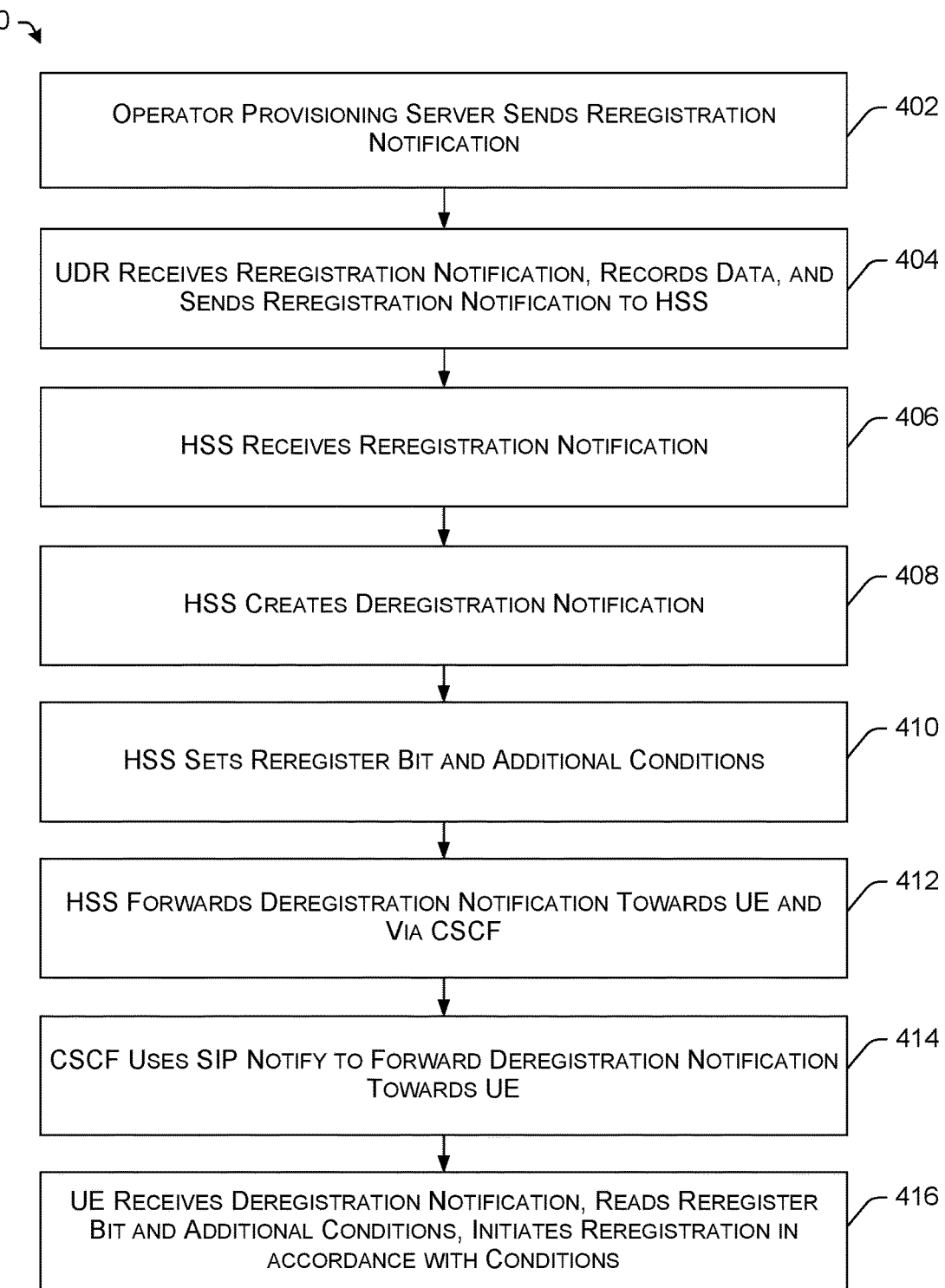

OPERATOR PROVISIONING SERVER SENDS REREGISTRATION NOTIFICATION — 402

UDR RECEIVES REREGISTRATION NOTIFICATION, RECORDS DATA, AND SENDS REREGISTRATION NOTIFICATION TO HSS — 404

HSS RECEIVES REREGISTRATION NOTIFICATION — 406

HSS CREATES DEREGISTRATION NOTIFICATION — 408

HSS SETS REREGISTER BIT AND ADDITIONAL CONDITIONS — 410

HSS FORWARDS DEREGISTRATION NOTIFICATION TOWARDS UE AND VIA CSCF — 412

CSCF USES SIP NOTIFY TO FORWARD DEREGISTRATION NOTIFICATION TOWARDS UE — 414

UE RECEIVES DEREGISTRATION NOTIFICATION, READS REREGISTER BIT AND ADDITIONAL CONDITIONS, INITIATES REREGISTRATION IN ACCORDANCE WITH CONDITIONS — 416

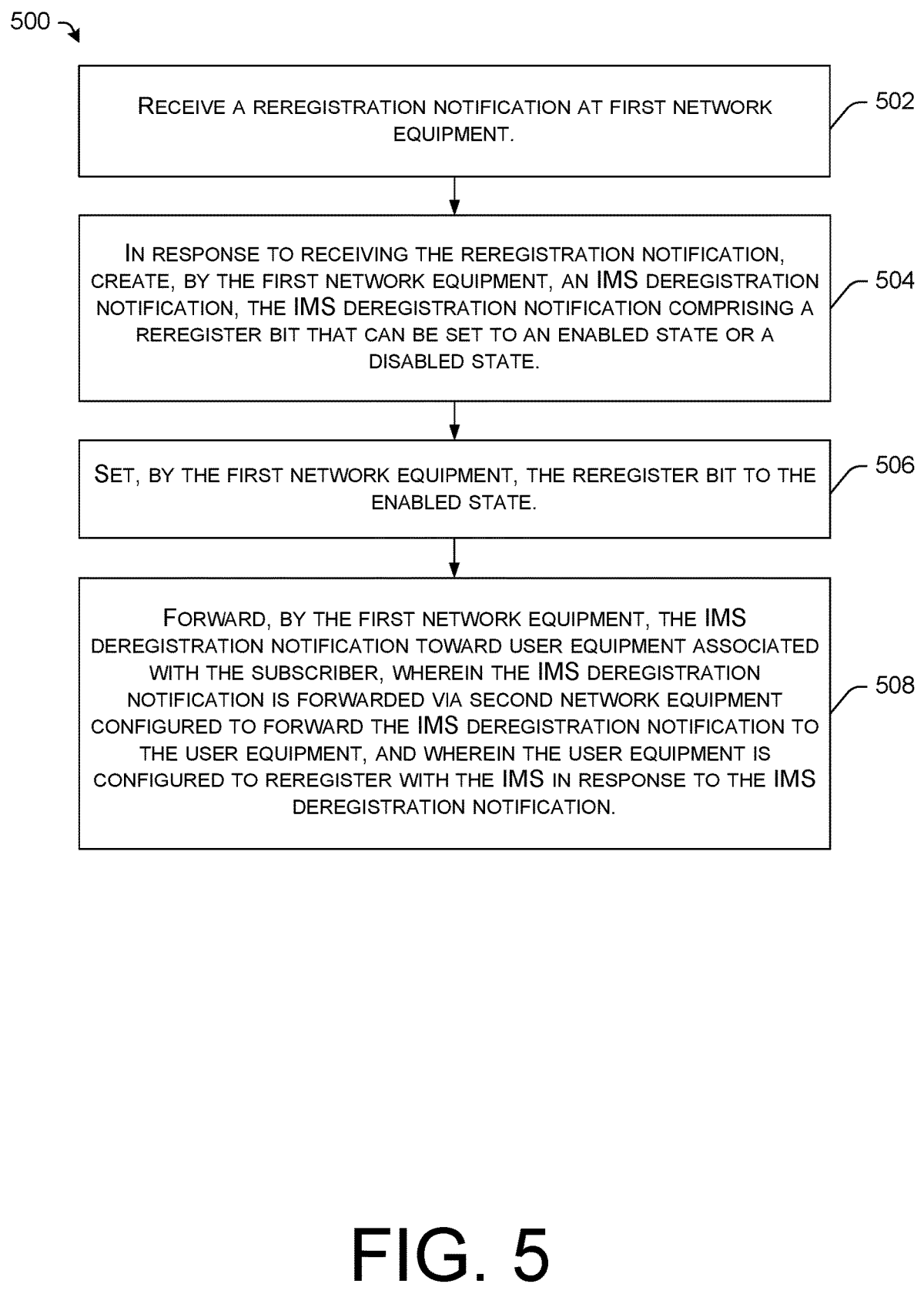

RECEIVE A REREGISTRATION NOTIFICATION AT FIRST NETWORK EQUIPMENT. — 502

IN RESPONSE TO RECEIVING THE REREGISTRATION NOTIFICATION, CREATE, BY THE FIRST NETWORK EQUIPMENT, AN IMS DEREGISTRATION NOTIFICATION, THE IMS DEREGISTRATION NOTIFICATION COMPRISING A REREGISTER BIT THAT CAN BE SET TO AN ENABLED STATE OR A DISABLED STATE. — 504

SET, BY THE FIRST NETWORK EQUIPMENT, THE REREGISTER BIT TO THE ENABLED STATE. — 506

FORWARD, BY THE FIRST NETWORK EQUIPMENT, THE IMS DEREGISTRATION NOTIFICATION TOWARD USER EQUIPMENT ASSOCIATED WITH THE SUBSCRIBER, WHEREIN THE IMS DEREGISTRATION NOTIFICATION IS FORWARDED VIA SECOND NETWORK EQUIPMENT CONFIGURED TO FORWARD THE IMS DEREGISTRATION NOTIFICATION TO THE USER EQUIPMENT, AND WHEREIN THE USER EQUIPMENT IS CONFIGURED TO REREGISTER WITH THE IMS IN RESPONSE TO THE IMS DEREGISTRATION NOTIFICATION. — 508

FIG. 5

CONTROLLABLE DEVICE
REREGISTRATION TECHNIQUES

BACKGROUND

In current telecommunication networks, device registration with the network is generally controlled by devices themselves. For example, a device may register itself with a network after it is purchased by a subscriber and initially activated by the subscriber. The device may reregister, for example if it is power cycled by being switched off and on, or under a variety of other circumstances. However, in some cases there may be long intervals between successive device reregistration operations.

There are certain device and/or network configuration settings which are established at the time of device registration or reregistration. When there is a need to change such device and/or network configuration settings, the network may be required to wait for a next device reregistration, which may entail a longer wait than desirable. Therefore, there is a need for improved operator capabilities to initiate device reregistrations and control the timing of device reregistrations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates an example flowchart comprising operations performed in connection with controllable device reregistration, according to an example of the present disclosure.

FIG. 5 illustrates an example flowchart comprising operations performed by example first network equipment in connection with controllable device reregistration, according to an example of the present disclosure.

DETAILED DESCRIPTION

Figure 1:
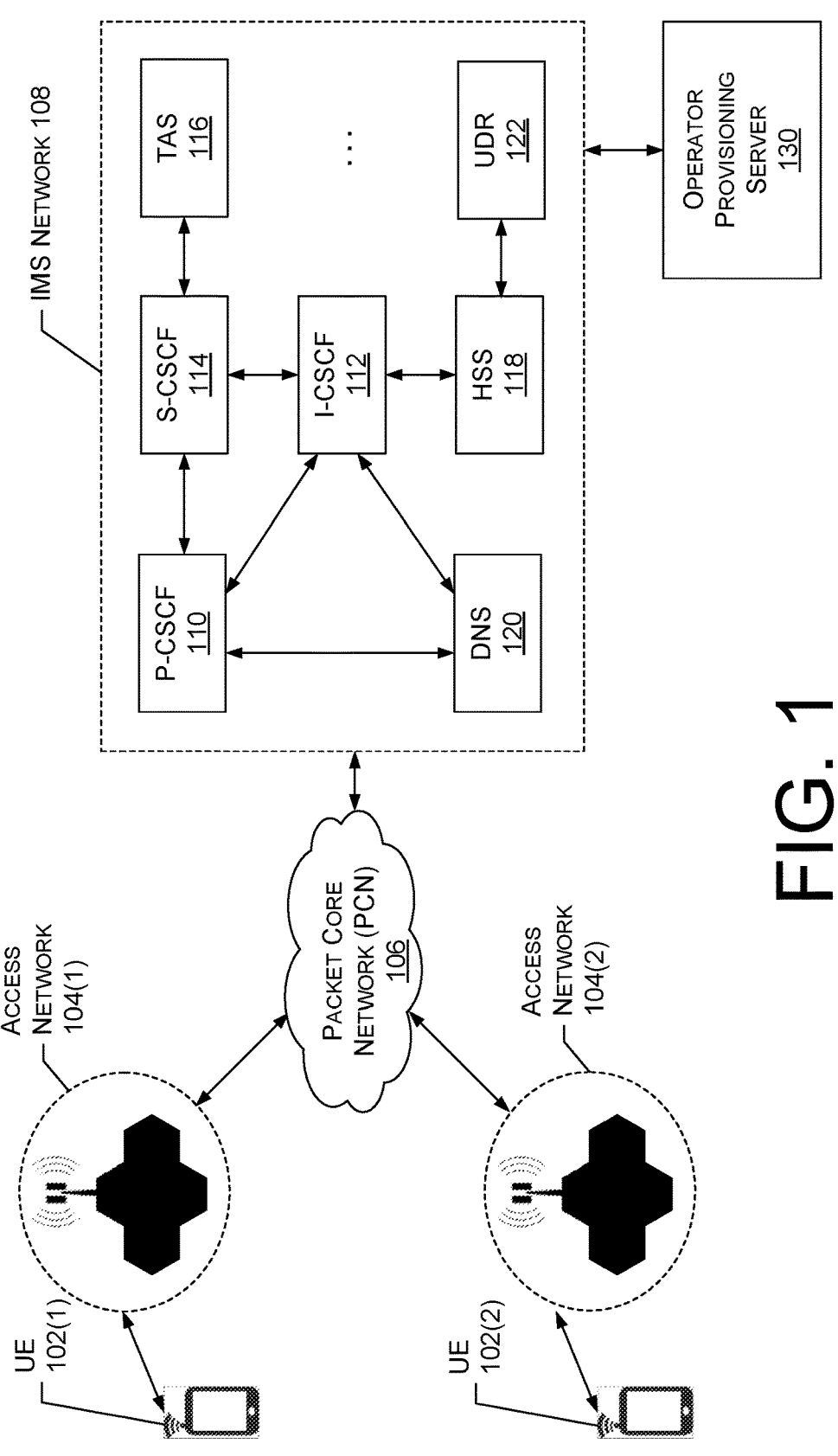
FIG. 1 illustrates an example network scenario in which controllable device reregistration can be implemented, according to an example of the present disclosure.

Techniques for controllable device deregistration and reregistration, which provide for enhanced network operator control over the timing of device deregistration and reregistration, are disclosed herein.

In implementations, techniques disclosed herein can be applied at least in part by a home subscriber service (HSS) of an internet protocol multimedia core network subsystem (IMS). In response to a reregistration notification initiated by a network operator, the HSS can create an IMS deregistration notification comprising a reregister bit and can set the reregister bit to an enabled state. The HSS can then forward the IMS deregistration notification to downstream network equipment such as call session control functions (CSCF), which can in turn forward the IMS deregistration notification to a user equipment (UE), thereby causing the UE to re-register with the IMS.

Current IMS networks, without the benefit of this disclosure, do not enable network operators to force user equipment (UEs) to initiate IMS reregistration. Instead, current IMS reregistration methods are unidirectional. Device session initiation protocol (SIP) configurations drive IMS reregistrations, and so IMS reregistrations are initiated at the UE, leaving the initiation of reregistration outside of network operator control. Different devices may initiate reregistration differently and according to different timing. For example, some devices may perform immediate IMS reregistration responsive to certain network conditions or events, while other devices may wait to perform IMS reregistration. Embodiments of this disclosure allow the network operator to control the timing and configuration of device reregistrations, by either by forcing an immediate reregistration, or by initiating a reregistration that can occur at a controllable future time.

In an example embodiment, IMS network components can be configured to enable network operators to force devices/UEs to reregister on an IMS network. The IMS network components can furthermore be configured to fetch updated IMS subscription profiles, e.g., from a User Data Request (UDR) function and/or from a home subscription service (HSS) function, and the IMS network components can supply reregistration rules, conditions and/or other data based on the updated IMS subscription profiles to UEs. UEs can be configured to perform reregistrations according to supplied rules, conditions and/or other data.

In example embodiments, an HSS can be configured with a capability to create a deregistration notification, in response to an instruction such as a reregistration notification from a network operator server. The deregistration notification can comprise, e.g., a Cx RTR or N70 "Nhss_ImsUECM_DeregistrationNotification" with a re-register bit that is enabled by the HSS. The HSS can forward the deregistration notification to downstream components in an IMS network, e.g., to a serving call session control function (S-CSCF).

The S-CSCF can be configured with a capability to process the reregister bit in the deregistration notification. In some embodiments, the S-CSCF can forward the deregistration notification, or another reregister instruction, in a session initiation protocol (SIP) notify message with a cause code set to "Terminate." The S-CSCF can be configured to send the deregistration notification bit towards a proxy call session control function (P-CSCF) and the UE to which the deregistration notification applies.

The UE can be configured with the capability to receive and process the deregistration notification comprising the enabled reregister bit. When the deregistration notification indicates immediate reregistration, the UE can be configured to initiate an IMS SIP reregister procedure immediately and seamlessly, irrespective of UE model/make/operating system. When the deregistration notification indicates delayed reregistration, the UE can be configured to initiate an IMS SIP reregister procedure after a delay period specified in the deregistration notification.

Some embodiments can allow for update of IMS subscriptions seamlessly and without voice or video call interruptions. Such seamless configuration updates can be a valuable feature of next generation IMS networks.

In some embodiments according to this disclosure, the HSS can be configured with the capability to share updated slice information to the S-CSCF. The HSS can use, for example, Cx or N70 interface commands, e.g., a Cx registration termination request (RTR) command or an N70 "Nhss_ImsUECM_Deregistration Notification" message.

In further embodiments according to this disclosure, the HSS can be configured with the capability to send deregistration notifications including conditions such as: reregister: immediate: reregister: after configured timer (e.g., 30 minutes or other interval); or reregister: immediate on a new IMS slice.

Using the IMS reregistration activation techniques herein, embodiments can accomplish IMS subscriber profile updates seamlessly and immediately. Furthermore, network operators can share new network slice information immediately. The disclosed techniques can also be beneficially applied in the context of network recovery during or after IMS outages.

The techniques discussed herein may be implemented in a computer network using one or more of protocols including but are not limited to Ethernet, 3G, 4G, 4G/LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example network scenario in which controllable device reregistration can be implemented, according to an example of the present disclosure.

The network scenario 100, as illustrated in FIG. 1 may be part of a telecommunication network of a wireless service provider such as, T-Mobile, AT&T, Verizon Wireless, etc. The telecommunication network may include one or more packet core networks, one or more IP multimedia subsystems (IMSs) and one or more access networks through which, user equipment can connect to the one or more packet core networks and the IMSs. The packet core network, for example, PCN 106, may be a 4G evolved packet core (EPC) network or a 5G core network. The one or more access networks, for example, access network 104(1) and access network 104(2), may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology.

The access networks 104(1) and 104(2) may include various types of base stations, for example, 2G base stations and/or 3G NodeBs that are associated with GSM and CDMA access network, eNBs that are associated with an LTE access network known as an Evolved UMTS Terrestrial Radio Access Network (E-UTRAN), or gNBs or as new radio (NR) base stations that are associated with a 5G access network.

The IMS network, for example, IMS network 108, may include multiple components that function together to deliver multimedia communications services such as voice, video and text messaging over the IP network, e.g., PCN 106. For example, the IMS network 108 may include, inter alia, a proxy call session control function (P-CSCF) 110, an interrogating call session control function (I-CSCF) 112, a serving call session control function (S-CSCF) 114, a telephony application server (TAS) 116, a home subscriber server (HSS) 118, a domain name server (DNS) 120, a user data request function (UDR) 122.

As discussed herein, a user equipment may need to be registered on the IMS network in order to use the IP multimedia service. As shown in FIG. 1, the UE 102(1) may connect to the PCN 106 through the access network 104(1) and further register on the IMS network 108: while the UE 102(2) may connect to the PCN 106 through the access network 104(2) and further register on the IMS network 108. During the registration process, the I-CSCF 112 may send a user authentication request (UAR) to the home subscriber server (HSS) 118 to authenticate a user equipment, e.g., UE 102(1) or UE 102(2). The HSS 118 may return a user authentication answer (UAA) that indicates whether the UAR is approved. In some examples, the P-CSCF 110 may query a domain name server (DNS) 120 to discover a fully qualified domain name (FQDN) or the IP address of the I-CSCF 112 to forward the registration request from the UE. The I-CSCF 112 may also query the DNS 120 to obtain the FQDN or the IP address of the S-CSCF 114 to forward the registration request to complete the registration of the UE.

This disclosure provides, inter alia, techniques which allow the operator provisioning server 130 to initiate reregistration of the UE, e.g., UE 102(1) or UE 102(2), via a communication to the IMS network 108. In an example, the operator provisioning server 130 may determine that reregistration of UE 102(2) is appropriate based on any number of different circumstances. In one example circumstance, the operator provisioning server 130 may determine that reregistration of the UE 102(2) is appropriate due to a network outage of, e.g., a component of the access network 104(2) or a component of the PCN 106. Reregistration of the UE 102(2) can be effective to cause the UE 102(2) to utilize different components of the access network 104(2) or the PCN 106, thereby avoiding the network outage.

In another example circumstance, the operator provisioning server 130 may determine that reregistration of the UE 102(2) is appropriate to trigger an immediate update of a network slice used by the UE 102(2). For example, if a network slice used by the UE 102(2) becomes overloaded, the operator provisioning server 130 may initiate a reregistration of the UE 102(2) in order to move the UE 102(2) to a different network slice.

The operator provisioning server 130 can send a reregistration notification to the IMS network 108. The reregistration notification can specify one or more UEs, e.g., UE 102(2), and can include an instruction to initiate re-registration of the specified UEs, optionally along with additional conditions or data to be applied in connection with the reregistration. The components of the IMS network 108 can be configured to receive and process the reregistration notification. In some embodiments, at least one of the components of the IMS network 108 can generate, based on the reregistration notification, a deregistration notification including a reregistration bit, and the reregistration bit can be set to an enabled state. The deregistration notification can also include any additional conditions or data to be applied in connection with the reregistration.

In an example, a first component of the IMS network 108 may receive the reregistration notification, perform a first task with regard to the reregistration notification, and then forward the reregistration notification (or a related notification such as the deregistration notification with reregistration bit set) to a next component. The next component may in turn perform a next task and forward the reregistration/ deregistration notification to a next component, and so on until a final component of the IMS network 108 forwards the reregistration/deregistration notification towards the UE 102 (2) via the PCN 106 and access network 104(2). The UE 102(2) can be configured receive and process the reregistration/deregistration notification, and responsively initiate reregistration of the UE 102(2) in accordance with any rules or conditions included in the reregistration/deregistration notification.

In some embodiments, the components of the IMS network 108 and the UEs 102(1), 102(2) can be modified to include functions or modules adapted to receive and process the reregistration/deregistration notifications described herein. Therefore, embodiments of this disclosure can optionally involve multiple modifications to multiple different types of network equipment, as well as modifications to UEs, which can optionally be implemented in UE software deployed by UE manufacturers.

This disclosure is not limited to any particular additional conditions or data which can be applied in connection with reregistration notifications. In some examples, the additional conditions or data may specify network slice information for use by UEs upon reregistration. In another example, the additional conditions or data may specify timing information that controls timing for initiating reregistrations by UEs. In some circumstances, e.g., network outages affecting many UEs, it may be desirable to control reregistration timing to stagger device reregistrations and prevent network overload.

Once the UE 102(1) or UE 102(2) is registered (or reregistered) on the IMS network 108, the UE 102(1) or UE 102(2) can use the services provided through a plurality of application servers on the IMS network 108. The TAS 116 in the IMS network 108, for example, may provide basic call processing services and supplementary multimedia services between the users such as call setup, call waiting, call forwarding, caller ID service, origination-denial, termination-denial, lettering and coloring, etc.

It should be understood that the network scenario shown in FIG. 1 is for the purpose of illustration. In various real-world scenarios, telecommunication networks or one or more subsystems of a telecommunication network can be logically divided into a number of regions. Each of the regions may logically include a packet core network and an IMS network. Furthermore, in some examples, each of the DNS 120, the HSS 118, and the TAS 116 may be configured as a centralized component of the telecommunication network accessible to all logically divided IMS networks. Further, although the IMS network as shown in FIG. 1 includes a single P-CSCF 110, a single S-CSCF 114, and a single I-CSCF 112, the IMS network 108 can optionally include two or more P-CSCFs, S-CSCFs, and I-CSCFs.

The techniques discussed herein may be implemented in the telecommunication network using one or more of protocols including but are not limited to Ethernet, 3G, 4G, 4G LTE, 5G, or any combination thereof. The techniques may be implemented in the telecommunication network using 6G and/or future radio access technologies.

Figure 2:
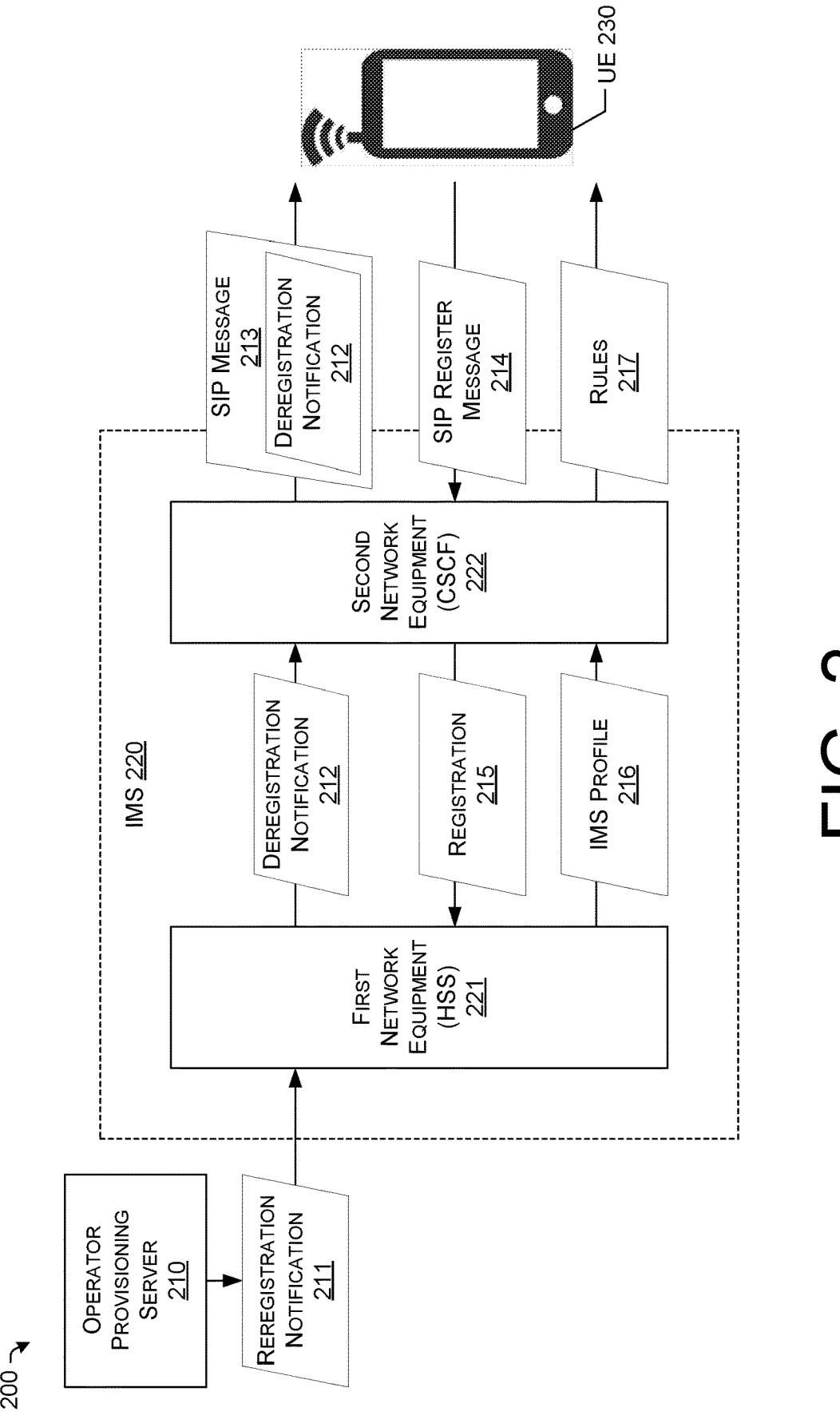
FIG. 2 illustrates example network components and example communications therebetween, which can be applied in connection with controllable device reregistration, according to an example of the present disclosure.

FIG. 2 illustrates example network components and example communications therebetween, which can be applied in connection with controllable device reregistration, according to an example of the present disclosure. FIG. 2 includes an example network 200 that can comprise, inter alia, an operator provisioning server 210, an IMS 220, and a UE 230. The operator provisioning server 210, the IMS 220, and the UE 230 can implement the operator provisioning server 130, the IMS network 108, and either of the UEs 102(1) or 102(2) introduced in FIG. 1 in some embodiments.

The illustrated example IMS 220 can comprise, inter alia, first network equipment 221, e.g., an HSS, and second network equipment 222, e.g., a CSCF. The first network equipment 221 can implement the HSS 118 (introduced in FIG. 1) in some embodiments, and the second network equipment 222 can implement any of the CSCF components 110, 112, 114 (introduced in FIG. 1) in some embodiments.

In FIG. 2, the operator provisioning server 210 can be configured to send a reregistration notification 211 to the first network equipment 221. The first network equipment 221 can receive the reregistration notification 211 and generate a deregistration notification 212 based on the reregistration notification 211. The first network equipment 221 can forward the deregistration notification 212 to the second network equipment 222.

The second network equipment 222 can receive the deregistration notification 212 and can generate a session initiation protocol (SIP) message 213 based on the deregistration notification 212, and the SIP message 213 can optionally include the deregistration notification 212. The second network equipment 222 can forward the SIP message 213 to the UE 230.

Figure 3:
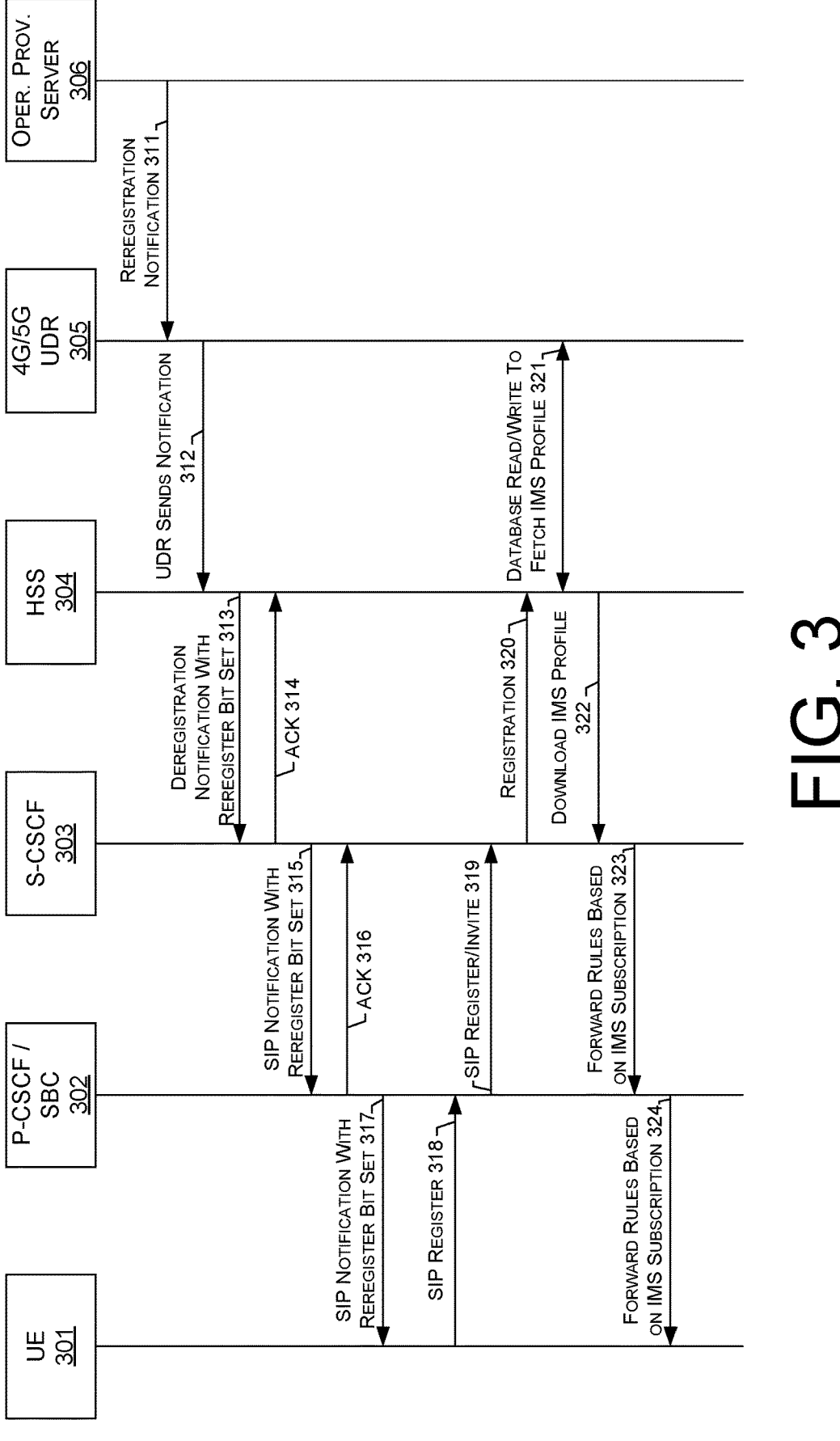
FIG. 3 illustrates further example network components and example communications therebetween, which can be applied in connection with controllable device reregistration, according to another example of the present disclosure.

In addition to the illustrated components of the IMS 220 and notifications/messages exchanged thereby, the IMS 220 can furthermore comprise any number of additional components that can receive, process and forward the reregistration notification 211 and/or the deregistration notification 212. Such additional components can be positioned to process notifications and messages before, in between, or after the first network equipment 221 and/or the second network equipment 222. FIG. 3 illustrates several example additional components, with the understanding that further additional components and notifications may be included in some embodiments without departing from the spirit and scope of this disclosure.

The UE 230 can receive the SIP message 213 including the deregistration notification 212, and the UE 230 can be configured to read the deregistration notification 212 and initiate a reregistration of the UE 230 in response to a reregister bit being enabled within the deregistration notification 212. Furthermore, the UE 230 can be configured to apply any conditions, rules and/or data included in the deregistration notification 212.

Reregistration operations of the UE 230 can comprise sending a SIP register message 214 to the IMS 220, e.g., to the second network equipment 222. IMS 220 can process the SIP register message 214, e.g., by the second network equipment 222 sending registration 215 to the first network equipment 221, the first network equipment 221 returning an IMS profile 216 (e.g., a subscriber profile of a subscriber associated with UE 230) to the second network equipment 222, and the second network equipment 222 sending rules 217 to the UE 230. The UE 230 can be adapted to apply rules 217 in connection with its operations subsequent to reregistration of the UE 230.

FIG. 3 illustrates further example network components and example communications therebetween, which can be applied in connection with controllable device reregistration, according to another example of the present disclosure. FIG. 3 comprises a UE 301, a P-CSCF/SBC 302, an S-CSCF 303, an HSS 304, a 4G/5G UDR 305, and an operator provisioning server 306. The illustrated components can implement like components in FIG. 1 in some embodiments.

FIG. 3 illustrates example communications between the illustrated components. At 311, the operator provisioning server 306 can initiate reregistration of the UE 301, e.g., by sending a reregistration notification 311 to the 4G/5G UDR 305. In an embodiment, the operator provisioning server 306 may modify an IMS subscription associated with the UE 301, such as a voice over long term evolution (VOLTE) subscription or a voice over new radio (VoNR) subscription, and the operator provisioning server 306 can send the reregistration notification 311 in response to such a modification. At 312, the 4G/5G UDR 305 sends a notification to the HSS 304, e.g., a notification based on the reregistration notification 311.

At 313, the HSS 304 sends a deregistration notification with reregister bit set to the S-CSCF 303. The deregistration notification can comprise, e.g., a Cx RTR command, or an N70 "Nhss_ImsUECM_DeregistrationNotification" message, or any other notification type. The reregister bit can optionally comprise a new data element introduced into prior developed notification types. At 314, the S-CSCF 303 can return an acknowledgement (ACK) to the HSS 304.

At 315, the S-CSCF 303 can send a SIP notification with a reregister bit set to the P-CSCF/SBC 302. An example SIP notification can set a cause code to "terminate." The SIP notification with a reregister bit set is an example of a modified deregistration notification that can be based on the deregistration notification received from the HSS 304. At 316, the P-CSCF/SBC 302 can return an acknowledgement (ACK) to the S-CSCF 303. At 317, the P-CSCF/SBC 302 can send the SIP notification with the reregister bit set to the UE 301.

The UE 301 can receive and process the SIP notification with the reregister bit set, and in response to reading the enabled/set reregister bit, the UE 301 can be configured to initiate a reregistration. At 318, the UE 301 can send a SIP register 318 to the P-CSCF/SBC 302. At 319, the P-CSCF/SBC 302 can forward the SIP register/invite to the S-CSCF 303.

At 320, the S-CSCF 303 can send a registration to the HSS 304 in order to reregister the UE 301 with the HSS 304. The registration can comprise, e.g., a Cx Multimedia-Auth-Request (MAR), a Cx Server-Assignment-Request (SAR), an N70 Nhss_ImsUECM_Registration/nhss_IMSUEAuthenticate/Get", or any other registration message or command.

Pursuant to the reregistration, at 321 the HSS 304 can use the 4G/5G UDR 305 in connection with a database read/write to fetch an IMS profile associated with the UE 301. At 322 the HSS 304 can download the fetched IMS profile to the S-CSCF 303. At 323, the S-CSCF 303 can forward rules based on the IMS subscription (the subscription associated with the IMS profile) to the P-CSCF/SBC 302. At 324, the P-CSCF/SBC 302 can forward the rules based on the IMS subscription to the UE 301. The rules can optionally include slice rules governing slices for use by the UE 301 or any other rules or conditions described herein.

FIG. 4 illustrates an example flowchart comprising operations performed in connection with controllable device reregistration, according to an example of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 4 can be performed at least in part network equipment, such as the various network equipment illustrated in FIG. 3. At operation 402, the operator provisioning server 306 sends a reregistration notification to the IMS or a component thereof, such as the 4G/5G UDR 305. At operation 404, the 4G/5G UDR 305 can receive the reregistration notification record data therefrom, e.g., subscriber profile modifications, and send a reregistration notification to the HSS 304.

At operation 406, the HSS 304 receives the reregistration notification, e.g., from the 4G/5G UDR 305. At operation 408, the HSS 304 creates a deregistration notification based on the received reregistration notification. At operation 410, the HSS 304 sets/enables the reregister bit in the deregistration notification. The HSS 304 can furthermore set any additional conditions, such as timing conditions or slice information for use in connection with the reregistration of the UE 301. At operation 412, the HSS 304 forwards the configured deregistration notification towards the UE 301 and via one or more CSCF components, e.g., via S-CSCF 303 and/or P-CSCF 302.

At operation 414, the CSCF, e.g., the S-CSCF 303 and/or the P-CSCF 302, receives the deregistration notification and forwards it towards the UE 301. For example, the S-CSCF 303 may use a SIP notify message to forward the deregistration notification.

At operation 416, the UE 301 receives the deregistration notification, e.g., the SIP notify message comprising the deregistration notification, and the UE 301 processes/reads the deregistration notification. The UE 301 checks the reregister bit and any additional conditions associated with the deregistration notification. The UE 301 initiates a reregistration operation configured according to any additional conditions and in response to the reregister bit being enabled. In some embodiments, additional conditions can be applied after initiating registration, e.g., by the UE 301 applying rules received according to operation 324 illustrated in FIG. 3.

FIG. 5 illustrates an example flowchart comprising operations performed by example first network equipment in connection with controllable device reregistration, according to an example of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 5 can be performed at least in part by first network equipment, such as by the HSS 304 illustrated in FIG. 3. Operation 502 comprises receiving a reregistration notification at the first network equipment comprising a HSS 304 of an IMS, wherein the reregistration notification is associated with a subscriber. The reregistration notification can be received directly from the operator provisioning server 306 or via the 4G/5G UDR 305, and can be associated with a subscriber/owner of the UE 301.

In some embodiments, the operator provisioning server 306 may have triggered the reregistration notification in response to a modification of a voice over long term evolution (VOLTE) subscription associated with the subscriber or a modification of a voice over new radio (VoNR) subscription associated with the subscriber. In other embodiments, the operator provisioning server 306 may have triggered the reregistration notification in response to a network outage.

Operation 504 comprises, in response to receiving the reregistration notification, creating, by the first network equipment 304, an IMS deregistration notification, the IMS deregistration notification comprising a reregister bit that can be set to an enabled state or a disabled state. Operation 506 comprises setting, by the first network equipment 304, the reregister bit to the enabled state. The IMS deregistration notification can optionally further comprise additional conditions, such as slice information applicable by the UE 301 upon reregistration of the UE 301 with the IMS and/or timing information to indicate timing for reregistration of the UE 301 with the IMS.

When timing information is included in the deregistration notification, the timing information can indicate, e.g., an immediate reregistration of the UE 301 with the IMS, or a delayed reregistration of the UE 301 with the IMS. When the timing information indicates the delayed reregistration of the UE 301 with the IMS, the delayed reregistration can implement staggered reregistration of multiple UEs. For example, the timing information can implement a different delay period that is different from another delay period included in other timing information provided to other UEs, in order to stagger reregistration of the UE 301 and the other UEs. The first network equipment 304 can be configured to calculate timing information based on a number of UEs that need to reregister in response to a network outage. When more UEs need to reregister, longer stagger period intervals can be used, or additional stagger periods can be applied.

Operation 508 comprises forwarding, by the first network equipment 304, the IMS deregistration notification toward a UE 301 associated with the subscriber, wherein the IMS deregistration notification is forwarded via second network equipment (e.g., the CSCFs 303/302) configured to forward the IMS deregistration notification to the UE 301, and wherein the UE 301 is configured to reregister with the IMS in response to the IMS deregistration notification. The CSCFs 303/302 can be configured to use a SIP notify message to forward the IMS deregistration notification to the UE 301.

Figure 6:
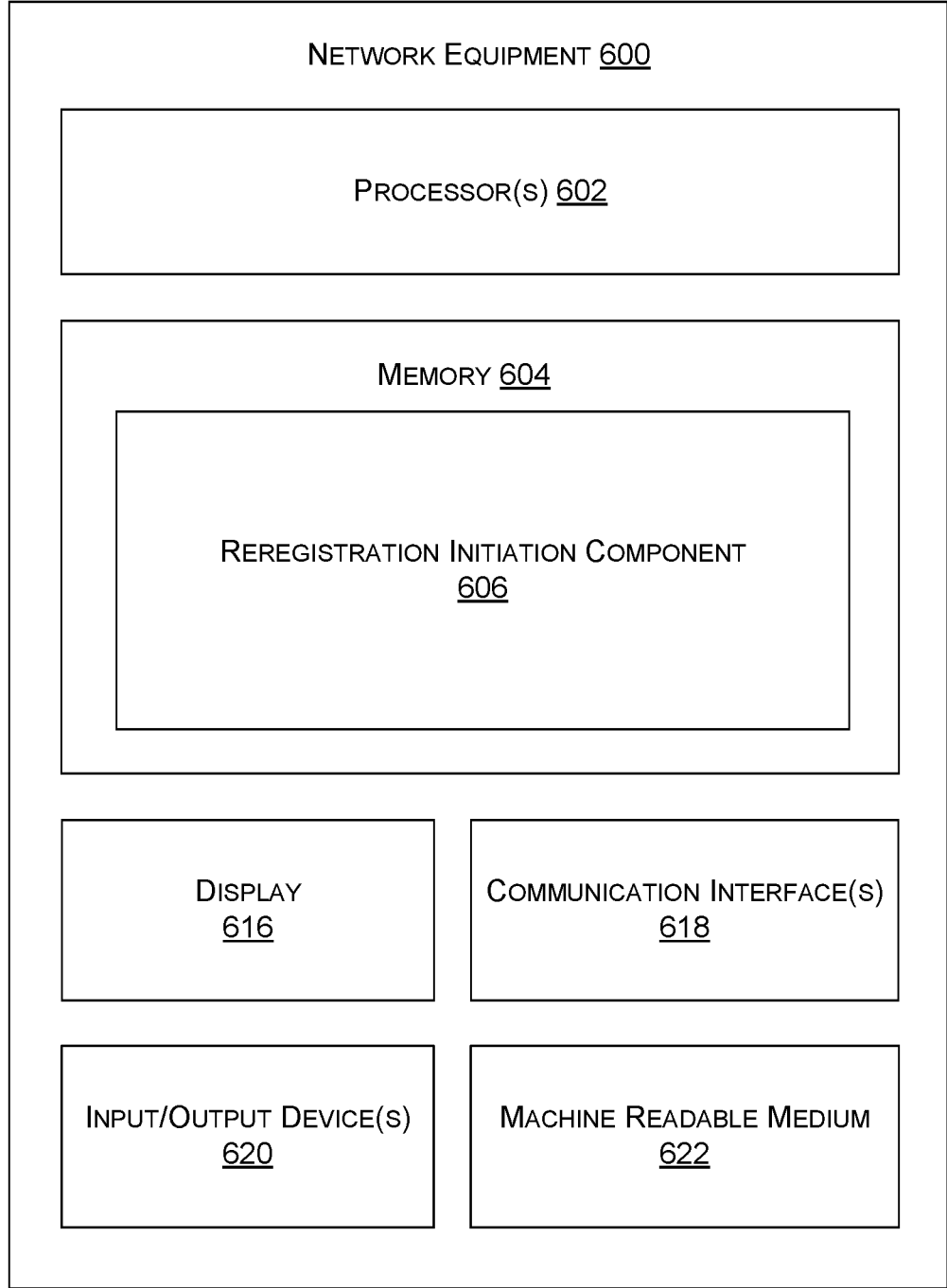
FIG. 6 illustrates example network equipment that can implement controllable device reregistration, according to an example of the present disclosure.

FIG. 6 illustrates example network equipment that can implement controllable device reregistration, according to an example of the present disclosure. In some embodiments, the example network equipment 600 may correspond to an element of an IMS network, such as the HSS 304 or the S-CSCF 303 illustrated in FIG. 3. In other embodiments, the example network equipment 600 may correspond to an operator provisioning server, such as the operator provisioning server 306 illustrated in FIG. 3. In still other embodiments, the example network equipment 600 may correspond to a UE, such as the UE 301 illustrated in FIG. 3.

As illustrated in FIG. 6, a network equipment 600 may comprise processor(s) 602, a memory 604 storing a reregistration initiation component 606, a display 616, communication interface(s) 618, input/output device(s) 620, and/or a machine readable medium 622.

In various examples, the processor(s) 602 can be a central processing unit (CPU), a graphics processing unit (GPU), or both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in memory 604, which can be associated with common types of volatile (RAM) and/or nonvolatile (ROM) memory.

In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the network equipment 600. Any such non-transitory computer-readable media may be part of the network equipment 600.

In embodiments wherein the network equipment 600 implements an operator provisioning server, such as the operator provisioning server 306 illustrated in FIG. 3, the reregistration initiation component 606 can be configured to monitor for network events such as outages and subscription changes, and generate a reregistration notification to send to an IMS in response to detected events.

In embodiments wherein the network equipment 600 implements an element of an IMS network, such as the HSS 304 illustrated in FIG. 3, the reregistration initiation component 606 can be configured to receive a reregistration notification initiated by the operator provisioning server 306 and configure a deregistration notification based on the received reregistration notification. The deregistration notification can comprise an enabled reregistration bit and any additional conditions, as described herein.

In embodiments wherein the network equipment 600 implements an element of an IMS network, such as the S-CSCF 303 illustrated in FIG. 3, the reregistration initiation component 606 can be configured to receive a deregistration notification from an upstream IMS component, process/store information from the deregistration notification, and forward the deregistration notification to a next element of the IMS or to the UE 301 via a PCN 106 and/or an access network 104(2) such as illustrated in FIG. 1.

In embodiments wherein the network equipment 600 implements a UE, such as the UE 301 illustrated in FIG. 3, the reregistration initiation component 606 can be configured to receive a deregistration notification, check the reregister bit, and when the reregister bit is enabled, initiate a reregistration of the UE 301 in accordance with any conditions observed in the deregistration notification.

The communication interface(s) 618 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 618 can be compatible with multiple radio access technologies, such as 5G radio access technologies and 4G/LTE radio access technologies. Accordingly, the communication interfaces 618 can allow the network equipment 600 to connect to the 5G system described herein.

Display 616 can be a liquid crystal display or any other type of display commonly used in the network equipment 600. For example, display 616 may be a touch-sensitive display screen and can then also act as an input device or keypad, such as for providing a soft-key keyboard, navigation buttons, or any other type of input.

Input/output device(s) 620 can include any sort of output devices known in the art, such as a display, speakers, a vibrating mechanism, and/or a tactile feedback mechanism. Input/output device(s) 620 can also include ports for one or more peripheral devices, such as headphones, peripheral speakers, and/or a peripheral display. Input/output device(s) 620 can include any sort of input devices known in the art. For example, input/output device(s) 620 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 622 can store one or more sets of instructions, such as software or firmware, that embodies any one or more of the methodologies or functions described herein. The instructions can also reside, completely or at least partially, within the memory 604, processor(s) 602, and/or communication interface(s) 618 during execution thereof by the network equipment 600. The memory 604 and the processor(s) 602 also can constitute machine readable media 622.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method comprising:
   receiving a reregistration notification at first network equipment comprising a home subscriber service of an internet protocol multimedia core subsystem (IMS), wherein the reregistration notification is associated with a subscriber;
   in response to receiving the reregistration notification, creating, by the first network equipment, an IMS deregistration notification, the IMS deregistration notification comprising a reregister bit that can be set to an enabled state or a disabled state;
   setting, by the first network equipment, the reregister bit to the enabled state; and
   forwarding, by the first network equipment, the IMS deregistration notification toward user equipment associated with the subscriber, wherein the IMS deregistration notification is forwarded via second network equipment configured to forward the IMS deregistration notification to the user equipment, and wherein the user equipment is configured to reregister with the IMS in response to the IMS deregistration notification.

2. The computer-implemented method of claim 1, wherein the IMS deregistration notification further comprises slice information applicable by the user equipment upon reregistration of the user equipment with the IMS.

3. The computer-implemented method of claim 1, wherein the IMS deregistration notification further comprises timing information to indicate timing for reregistration of the user equipment with the IMS.

4. The computer-implemented method of claim 3, wherein the timing information indicates an immediate reregistration of the user equipment with the IMS or a delayed reregistration of the user equipment with the IMS.

5. The computer-implemented method of claim 4, wherein the timing information indicates the delayed reregistration of the user equipment with the IMS, and wherein the delayed reregistration uses a different delay period that is different from another delay period included in other timing information provided to other user equipment, in order to stagger reregistration of the user equipment and the other user equipment.

6. The computer-implemented method of claim 1, wherein the reregistration notification is received at the first network equipment via an operator provisioning server and in response to a modification of a voice over long term evolution (VoLTE) subscription associated with the subscriber or a modification of a voice over new radio (VoNR) subscription associated with the subscriber.

7. The computer-implemented method of claim 1, wherein the reregistration notification is received at the first network equipment via an operator provisioning server and in response to a network outage.

8. The computer-implemented method of claim 1, wherein the reregistration notification is received at the first network equipment via an operator provisioning server and a user data request component.

9. The computer-implemented method of claim 1, wherein the second network equipment comprises at least one call session control function that is configured to use a session initiation protocol notify message to forward the IMS deregistration notification to the user equipment.

10. A system comprising:
a processor,
a network interface, and
non-transitory memory storing instructions executed by the processor to perform actions including:
receiving a reregistration notification at first network equipment associated with an internet protocol multimedia core subsystem (IMS), wherein the reregistration notification is associated with a subscriber;
in response to receiving the reregistration notification, creating, by the first network equipment, a deregistration notification, the deregistration notification comprising a reregister bit that can be set to an enabled state or a disabled state;
setting, by the first network equipment, the reregister bit to the enabled state; and
forwarding, by the first network equipment, the deregistration notification toward user equipment associated with the subscriber, wherein the deregistration notification is forwarded via second network equipment configured to forward the deregistration notification to the user equipment, and wherein the user equipment is configured to reregister with the IMS in response to the deregistration notification.

11. The system of claim 10, wherein the deregistration notification further comprises one or more of slice information applicable by the user equipment upon reregistration of the user equipment or timing information to indicate timing for reregistration of the user equipment.

12. The system of claim 11, wherein the timing information indicates an immediate reregistration of the user equipment or a delayed reregistration of the user equipment.

13. The system of claim 11, wherein the reregistration notification is received at the first network equipment via an operator provisioning server and in response to at least one of a modification of a subscription associated with the subscriber a network outage.

14. The system of claim 11, wherein the reregistration notification is received at the first network equipment via an operator provisioning server and a user data request component.

15. The system of claim 11, wherein the second network equipment comprises at least one call session control function that is configured to use a session initiation protocol notify message to forward the deregistration notification to the user equipment.

16. Non-transitory computer-readable storage medium storing computer-readable instructions, that when executed by a processor, cause the processor to perform actions comprising:
receiving a reregistration notification at a first network equipment associated with an internet protocol multimedia core subsystem (IMS), wherein the reregistration notification is associated with a subscriber;
in response to receiving the reregistration notification, creating, by the first network equipment, a deregistration notification, the deregistration notification comprising a reregister bit that can be set to an enabled state or a disabled state;
setting, by the first network equipment, the reregister bit to the enabled state; and
forwarding, by the first network equipment, the deregistration notification toward user equipment associated with the subscriber, wherein the deregistration notification is forwarded via second network equipment configured to forward the deregistration notification to the user equipment, and wherein the user equipment is configured to reregister with the IMS in response to the deregistration notification.

17. The non-transitory computer-readable storage medium of claim 16, wherein the deregistration notification further comprises slice information applicable by the user equipment upon reregistration of the user equipment.

18. The non-transitory computer-readable storage medium of claim 16, wherein the deregistration notification further comprises timing information to indicate timing for reregistration of the user equipment.

19. The non-transitory computer-readable storage medium of claim 18, wherein the timing information indicates an immediate reregistration of the user equipment or a delayed reregistration of the user equipment.

20. The non-transitory computer-readable storage medium of claim 16, wherein the second network equipment comprises at least one call session control function that is configured to use a session initiation protocol notify message to forward the deregistration notification to the user equipment.

* * * * *